United States Patent
Park et al.

(10) Patent No.: US 9,210,309 B2
(45) Date of Patent: Dec. 8, 2015

(54) CAMERA MODULE INCLUDING AN INFRARED RAY BLOCKING MEMBER AND A WINDOW FILM WHICH BLOCK NOISE LIGHT

(71) Applicant: Samsung Electro-Mechanics Co. Ltd., Suwon (KR)

(72) Inventors: Chuel Jin Park, Suwon (KR); Won Seob Oh, Suwon (KR); Dong Kyun Lee, Suwon (KR); Ki Mun Paik, Suwon (KR); Jung Wook Hwang, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 13/892,718

(22) Filed: May 13, 2013

(65) Prior Publication Data

US 2013/0308048 A1      Nov. 21, 2013

(30) Foreign Application Priority Data

May 15, 2012    (KR) .......................... 10-2012-0051551

(51) Int. Cl.
*H04N 5/225*    (2006.01)
*G02B 13/14*    (2006.01)

(52) U.S. Cl.
CPC .................................. *H04N 5/2254* (2013.01)

(58) Field of Classification Search
CPC ..................................................... H04N 5/2254

USPC ................................................... 348/374, 342
See application file for complete search history.

(56) References Cited

U.S. PATENT DOCUMENTS

| 6,734,419 | B1* | 5/2004 | Glenn et al. | 250/239 |
| 7,929,036 | B2* | 4/2011 | Miyamoto et al. | 348/311 |
| 2004/0147068 | A1* | 7/2004 | Toyoda et al. | 438/197 |
| 2008/0100910 | A1* | 5/2008 | Kim et al. | 359/356 |
| 2011/0267710 | A1* | 11/2011 | Shioda | 359/817 |

FOREIGN PATENT DOCUMENTS

| KR | 10-2008-0037767 | 5/2008 |
| KR | 10-0867525 | 10/2008 |
| KR | 10-2010-0001079 | 1/2010 |
| KR | 10-2010-0043829 | 4/2010 |
| KR | 10-2010-0122279 | 11/2010 |

OTHER PUBLICATIONS

Office Action mailed Feb. 23, 2015 for corresponding Korean Patent Application No. 10-2012-0051551.

\* cited by examiner

*Primary Examiner* — Joel Fosselman
(74) *Attorney, Agent, or Firm* — NSIP Law

(57) ABSTRACT

Disclosed herein is a camera module including: a lens barrel in which one or more lenses are installed; a housing accommodating the lens barrel; a printed circuit board coupled with a bottom of the housing and having an image sensor with a light receiving portion mounted thereon; a window film having a window formed therein to define an incident area of light incident on the image sensor; and an infrared ray blocking member blocking an infrared ray in the light incident on the image sensor.

13 Claims, 5 Drawing Sheets

- PRIOR ART -

CAMERA MODULE INCLUDING AN INFRARED RAY BLOCKING MEMBER AND A WINDOW FILM WHICH BLOCK NOISE LIGHT

CROSS REFERENCE(S) TO RELATED APPLICATIONS

This application claims the benefit under 35 U.S.C. Section 119 of Korean Patent Application Serial No. 10-2012-0051551, entitled "Camera Module" filed on May 15, 2012, which is hereby incorporated by reference in its entirety into this application.

BACKGROUND OF THE INVENTION

1. Technical Field

The present invention relates to a camera module, and, more particularly, to a camera module which can be thinned by changing the coupling structure of a housing and an infrared ray blocking member to reduce the entire height of the camera module.

2. Description of the Related Art

In accordance with the recent development of a technology of a portable terminal such as a cellular phone, a personal digital assistant (PDA), a tablet personal computer (PC), and the like, the portable terminal has been used for multi-convergence such as music, a movie, a television, a game, and the like, as well as a simple phone function. The most typical product among products leading the development for multi-convergence may be a camera module. Such camera modules are being changed to have high density pixels and various additional functions such as auto focusing (AF) and optical zooming.

Such camera modules are downsized so that they are employed by various IT devices including mobile communication devices such as camera phones, PDAs, and smart phones. Recently, devices having small camera modules have been increasingly released to meet the various demands from customers.

Thanks to the recent trend of downsizing, reducing sizes of components are upcoming challenges in the industry. In the past several years, mobile communication technologies and electronic components technologies have been changed in accordance with such trend, and now miniaturization, ultra thinning and high integration technologies are being combined.

In particular, as mobile terminals employing camera phones are being developed to be smaller and thinner, there are strong demands to reduce the height of the camera modules.

Conventional camera modules mainly include image sensors such as CCD or CMOS. More specifically, as shown in FIG. 1, a conventional camera includes an image sensor 1 converting an external image signal into an electrical signal, a printed circuit board 2 to which the image sensor 1 is electrically connected, a housing 3 placed over the printed circuit board 2, and a lens barrel 4 which is accommodated in an upper portion of the housing 3 and installs one or more lenses L therein.

The above-described camera module requires an infrared ray blocking member which blocks noise light or inappropriate light (infrared rays, ultraviolet rays) unnecessary for capturing high quality images, and a window member which opens an imaging area of the image sensor and covers the rest of the area.

To this end, in conventional camera modules, a protruding portion 5 is formed on inner peripheral surfaces of the housing 3 to function as a window. Further, the protruding portion 5 on the inner peripheral surfaces of the housing 3 is combined with an infrared ray blocking member 6 therebelow, such that infrared rays of overly long wavelength, which is incident on the image sensor 1, are blocked.

However, since the housing 3 is formed by plastic injection molding, the protruding portion 5, which is formed in the housing 3 at the time of injecting the housing 3, needs to have a certain thickness in order to provide the window shape and make space in which the infrared ray blocking member 6 is attached. Accordingly, there is a limitation in reducing the height of the camera module.

RELATED ART DOCUMENT

Patent Document (Patent Document 1) Korean Patent Laid-open Publication No. 2010-0043829
(Patent Document 2) Korean Patent Laid-Open Publication No. 2008-0037767
(Patent Document 3) Korean Patent Laid-open Publication No. 2010-0001079

SUMMARY OF THE INVENTION

An object of the present invention is to provide a camera module of which height may be reduced and in which a degree of freedom in design may be increased.

According to an exemplary embodiment of the present invention, there is provided a camera module including: a lens barrel in which one or more lenses are installed; a housing accommodating the lens barrel; a printed circuit board coupled with a bottom of the housing and having an image sensor with a light receiving portion mounted thereon; a window film having a window formed therein to define an incident area of light incident on the image sensor; and an infrared ray blocking member blocking an infrared ray in the light incident on the image sensor.

A guide may be formed in the housing to support a side of the infrared ray blocking member.

The window film may have a guide groove corresponding to the guide.

The window of the window film may correspond to the light receiving portion of the image sensor.

The window film may be formed on the infrared ray blocking member.

The infrared ray blocking member and the window film may be fixed to the housing by adhesive material applied along edges of the infrared ray blocking member.

The window film may be formed under the infrared ray blocking member.

The infrared ray blocking member and the window film may be fixed to the housing by adhesive material applied along edges of the infrared ray blocking member.

The camera module may further include a shield case covering top and side surfaces of the housing.

The camera module may further include an actuator moving the lens barrel in an optical axis direction within the housing.

DESCRIPTION OF THE PREFERRED EMBODIMENTS

Hereinafter, exemplary embodiments of the present invention will be described with reference to the accompanying drawings. However, the exemplary embodiments are described by way of examples only and the present invention is not limited thereto.

In describing the present invention, when a detailed description of well-known technology relating to the present invention may unnecessarily obscure the spirit of the present invention, a detailed description thereof will be omitted. Further, the following terminologies are defined in consideration of the functions in the present invention and may be construed in different ways depending on the intention of users and operators or conventions. Therefore, the definitions thereof should be construed based on the contents throughout the specification.

As a result, the spirit of the present invention is defined by the claims and the following exemplary embodiments may be provided to efficiently describe the spirit of the present invention to those skilled in the art.

Figure 2:
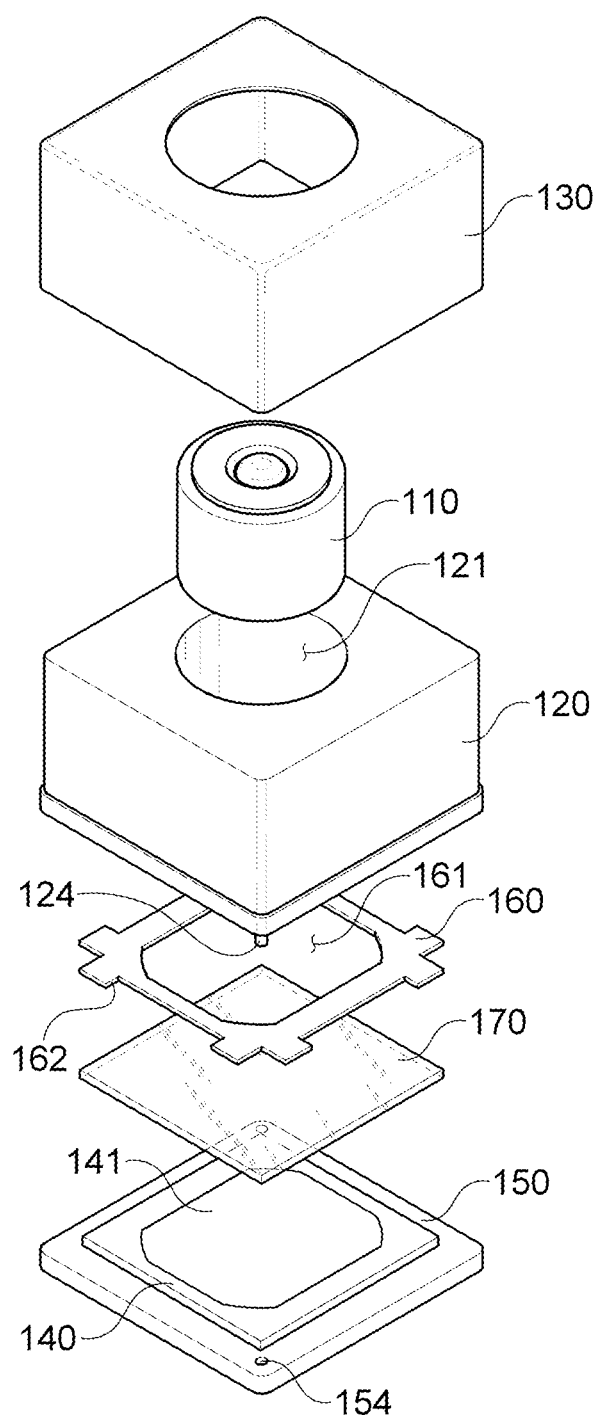
FIG. 2 is an exploded perspective view of a camera module according to an exemplary embodiment of the present invention.
Figure 3:
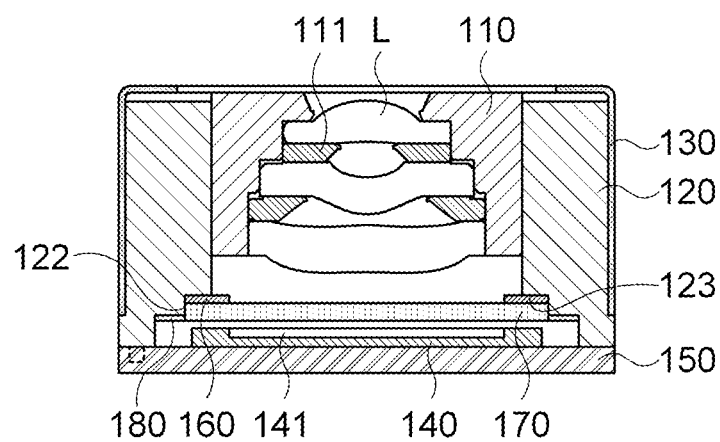
FIG. 3 is a cross-sectional view of a camera module according to an exemplary embodiment of the present invention.
Figure 4:
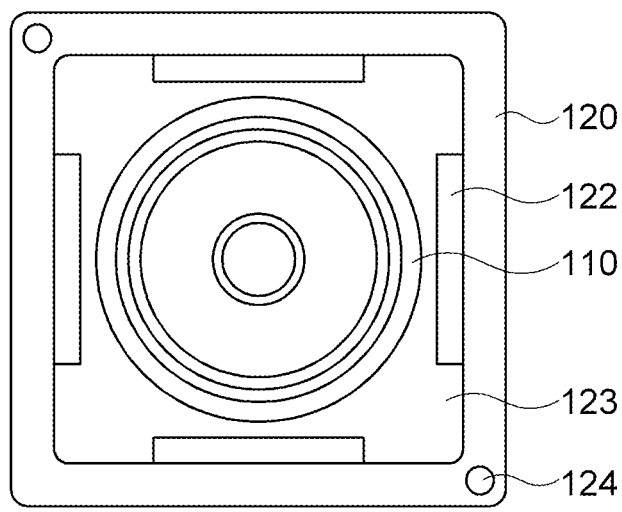
FIGS. 4 to 6 are bottom views showing a process of assembling a window film and an infrared ray blocking member onto the housing shown in FIG. 2.
Figure 5:
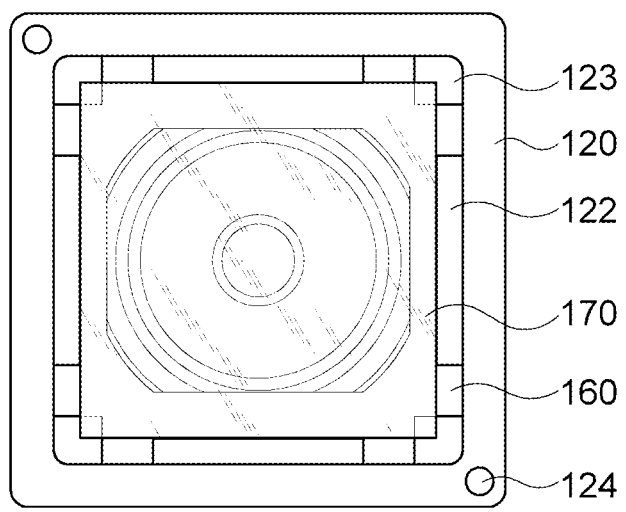
Figure 6:
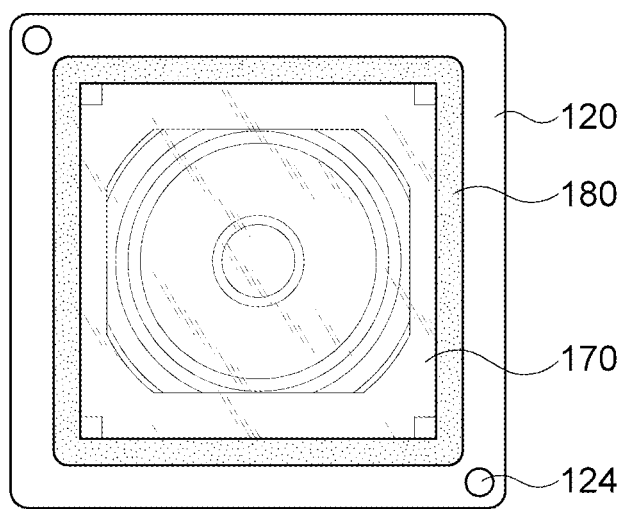

FIG. 2 is an exploded perspective view of a camera module according to an exemplary embodiment of the present invention, FIG. 3 is a cross-sectional view of a camera module according to an exemplary embodiment of the present invention, and FIGS. 4 to 6 are bottom views showing a process of assembling a window film and an infrared ray blocking member onto the housing shown in FIG. 2.

As can be seen from FIGS. 2 to 6, a camera module according to an exemplary embodiment of the present invention may include a lens barrel 110 in which one or more lenses L are installed, a housing 120 accommodating the lens barrel 110, a printed circuit board 150 coupled under the bottom of the housing 120 and having an image sensor 140 with a light reception portion 141 mounted thereon, a window film 160 having a window defining light incident on the image sensor 140 formed thereon, and an infrared ray blocking member 170 shielding the image sensor 140 from infrared ray in the incident light.

The lens barrel 110 has a cylinder shape so that it may accommodate one or more lenses L by stacking them. In this case, the inner side of the lens barrel 110 may be stepped so that lenses L may be mounted thereon.

In addition, when multiple lenses L are stacked inside the lens barrel 110, a space 111 may be formed between one lens and another. The number and type of lenses L accommodated may be determined as a designer intends.

The space 111 serves to regulate the distance between lenses L and may be formed of transparent or non-transparent material, and of elastic material.

The housing 120, which accommodates the lens barrel 110, may be formed of plastic or metal material and may have a box shape with electromagnetic wave shielding capability.

On the upper surface of the housing 120, an opening 121 may be formed through which the lens barrel 110 is accommodated and the lower surface of the housing 120 may be open in a tetrahedron shape.

Accordingly, the lens barrel 110 is accommodated through the opened top of the housing 120 and a printed circuit board 150 to be described below is coupled to seal the bottom of the housing 120.

Here, protruding coupling pins 124 may be formed at corners on the lower surface of the housing 120, and coupling grooves 154 into which the coupling pins 124 are inserted may by formed at corners on the upper surfaces of the printed circuit board 150.

In this connection, it is preferable that the coupling pins 124 and coupling grooves 154 are formed at two or more corners.

That is to say, the coupling pins 124 are inserted into the coupling grooves 154 so that the housing 120 and the printed circuit board 150 are coupled. By doing this, the coupling direction of the housing 120 and the printed circuit board 150 and distortion at the time of the coupling may be prevented.

Further, guides 122 are formed on inner surfaces of the housing 120 so as to support side portions of the infrared ray blocking member 170 to be described below, such that the center of the infrared ray blocking member 170 is in line with the center of the lens barrel 110 accommodated by the housing.

In addition, a shield case 130 is provided to cover upper and side surfaces of the housing 120 accommodating the lens barrel 110, such that constituent members in the housing 120 are protected.

In addition, a moving unit (not shown) may be further provided which moves the lens barrel 110 accommodated by the housing 120 along an optical axis direction so as to adjust the distance between the lens barrel 110 and the image sensor 140 to be described below, thereby implementing an auto focusing function of a camera module.

Here, the moving unit may employ a voice coil motor (VCM) scheme, which is a scheme of vertically moving the lens barrel 110 by electromagnetic force generated by the coil and the magnet, an ultrasonic wave motor scheme using a piezoelectric element, a scheme of vertically moving the lens barrel 110 by applying a current to a shape memory alloy, and the like, thereby making it possible to move the lens barrel 110 within the housing 120 along the optical axis direction such that the auto focus function is implemented.

The image sensor 140 is formed on the center of the upper surface of the printed circuit board 150 coupled with the lower surface of the housing 120, and is electrically connected to the board by wire bonding or flipchip bonding, for example.

Here, the image sensor 140 may have a light receiving portion 141 formed its upper surface which receives incident light through the lenses L of the lens barrel 110.

Further, the image sensor 140 converts the light received at the light receiving portion 141 into an electrical signal, and may be formed of any of a complementary metal-oxide semiconductor (CMOS) sensor or a charge coupled device (CCD) sensor.

Meanwhile, the printed circuit board 150 having the image sensor 140 formed thereon is coupled with the lower surface of the housing 120, and may be formed of one or more boards using a ceramic, metal or flexible substrate.

Between the housing 120 and the printed circuit board 150, the window film 160 defining the incident area of light incident on the image sensor 140 and the infrared ray blocking member 170 blocking infrared rays with overly long wavelengths introduced into the image sensor 140 may be formed.

Here, the window film 160 may be formed on the upper surface of the infrared blocking member 170 and may be formed as a thin film with the thickness of about 0.03 mm.

Further, at the sides of the window film 160, guide grooves 162 are formed in accordance with the positions where the guides 122 of the housing 120 are formed, such that the upper surface of the window film 160 is in close contact with the stepped surfaces 123 at the bottom of the housing 120.

In addition, grooves are formed at four corners of the window film 160, such that adhesive material 180 may be applied.

The window film 160 may have an opened window 161 at its center portion.

Here, the window 161 may correspond to the light receiving portion 141 of the image sensor 140, have the same size and shape with the light receiving portion 141, and cover the other area than the area where the light receiving portion 141 is formed. By doing so, among the lights incident through the lenses L of the lens barrel 110, only light incident through the area where the light receiving portion 141 is incident on the light receiving portion, and light incident through the other area than the area where the light receiving portion 141 is blocked, thereby improving the quality of a captured image.

Figure 1:
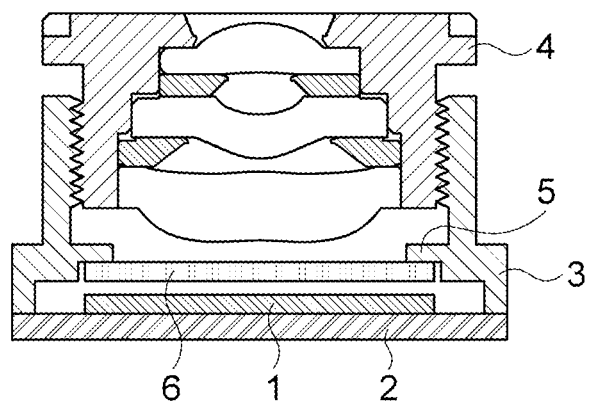
FIG. 1 is a cross-sectional view showing a camera module according to the prior art.

In other words, by using the window film 160 which is a thin film and has the window 161 for blocking noise light incident on the light receiving portion 141 of the image sensor 140, it is possible to reduce the thickness compared to the protruding portion 5 of the housing (see FIG. 1) which functions as a window in the conventional camera module, thereby reducing the entire height of a camera module. Further, a degree of freedom in design may be enhanced due to space between the image sensor and the lens barrel.

The infrared ray blocking member 170 is to block infrared rays of overly long wavelengths among the light incident on the light receiving portion 141 of the image sensor 140, and may be formed under the window film 160.

Here, the infrared blocking member 170 may be formed as one of an infrared ray blocking filter or an infrared ray blocking film having an infrared blocking layer on its one surface.

An assembly process of the camera module configured as above will be described with reference to FIGS. 4 to 6.

At first, the window film 160 is coupled with the lower surface of the housing 120 accommodating the lens barrel 110.

Here, the guides 122 of the housing are inserted into the guide grooves 162 formed at sides of the window film 160, such that it is in close contact with the stepped surfaces 123 of the housing 120.

Then, the infrared blocking member 170 may be coupled under the window film 160.

Here, the infrared ray blocking member 170 may be coupled in a such manner that its sides are fitted into and supported by the sides of the guides 122 of the housing 120.

Then, the adhesive material 180 may be applied along the edges of the infrared ray blocking member 170.

Here, the adhesive material 180 is applied into gaps between the infrared blocking member 170 and the inner sides of the housing 120 formed by the guides 122 of the housing 120, such that the window film 160 and the infrared ray blocking member 170 are fixed inside the housing 120.

Subsequently, the bottom of the housing 120 with the window film 160 and the infrared ray blocking member 170 is sealed with the printed circuit board 150 having the image sensor 141 mounted thereon, thereby assembling the camera module.

Figure 7:
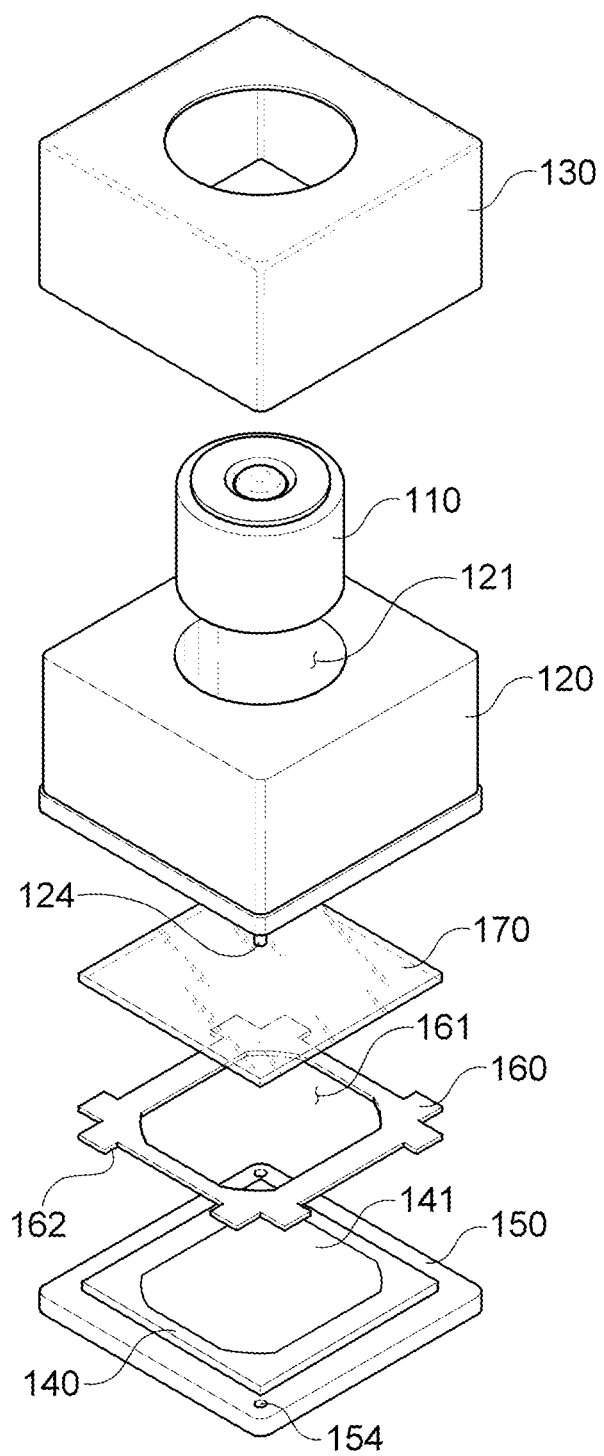
FIG. 7 is an exploded perspective view of a camera module according to another exemplary embodiment of the present invention.

FIG. 7 is an exploded perspective view of a camera module according to another exemplary embodiment of the present invention.

As can be seen in FIG. 7, a camera module according to another exemplary embodiment of the present invention may include a lens barrel 110 in which one or more lenses L are installed, a housing 120 accommodating the lens barrel 110, a printed circuit board 150 coupled under the bottom of the housing 120 and having an image sensor 140 with a light reception portion 141 mounted thereon, a window film 160 having a window 161 defining light incident on the image sensor 140 formed thereon, and an infrared ray blocking member 170 blocking the image sensor 140 from the infrared ray in the incident light.

Here, in the camera module according to the another embodiment of the present invention, a window film 160 is formed under an infrared ray blocking member 170, and is fixedly coupled to a housing 120 by adhesive material 180 applied along edges of the window film 160.

That is to say, the window film 160 may be formed on or under the infrared ray blocking member 170, such that the entire height of a camera module may be reduced, and a degree of freedom in design may be increased for the distance between an image sensor and lenses at a lower end of a lens barrel (Back Focal Length: BFL), as described above.

As set forth above, by using the window film which is a thin film and functions as a window, instead of a protruding portion protruding from a inner peripheral surface of a housing of a conventional camera module, the entire height of a camera module can be reduced, and a degree of freedom in design can be increased for the distance between an image sensor and lenses at a lower end of a lens barrel (Back Focal Length: BFL).

Although the exemplary embodiments of the present invention have been disclosed for illustrative purposes, those skilled in the art would appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

What is claimed is:

1. A camera module comprising:
   a lens barrel in which one or more lenses are installed;
   a housing accommodating the lens barrel, the housing including a step formed on the bottom of the housing;
   a printed circuit board coupled with a bottom of the housing and having an image sensor with a light receiving portion mounted thereon;
   a window film having a window with a shape of the light receiving portion of the image sensor, the window film covering an area other than an area of the light receiving portion of the image sensor and not covering any portion of the area of the light receiving portion of the image sensor; and
   an infrared ray blocking member blocking an infrared ray of light incident on the image sensor,
   the window film and the infrared ray blocking member both being positioned in the step.

2. The camera module according to claim 1, wherein a guide is formed in the housing to support a side of the infrared ray blocking member.

3. The camera module according to claim 2, wherein the window film has a guide groove corresponding to the guide.

4. The camera module according to claim 1, wherein the window of the window film corresponds to the light receiving portion of the image sensor.

5. The camera module according to claim 1, wherein the window film is formed on the infrared ray blocking member.

6. The camera module according to claim 5, wherein the infrared ray blocking member and the window film are fixed to the housing by adhesive material applied along edges of the infrared ray blocking member.

7. The camera module according to claim 1, wherein the window film is formed under the infrared ray blocking member.

8. The camera module according to claim 7, wherein the infrared ray blocking member and the window film are fixed to the housing by adhesive material applied along edges of the window film.

9. The camera module according to claim 1, further comprising a shield case covering top and side surfaces of the housing.

10. The camera module according to claim 1, further comprising an actuator moving the lens barrel in an optical axis direction within the housing.

11. The camera module according to claim 1,
wherein the window film is located beneath the lens barrel which includes the one or more lenses, and
wherein the window film blocks a light ray in the visible spectrum from entering the area other than the area of the light receiving portion of the image sensor.

12. The camera module according to claim 11, wherein the infrared ray blocking member is separate from the lens barrel in which the one or more lenses are installed.

13. The camera module according to claim 1, wherein the window film having the window with the shape of the light receiving portion of the image sensor is flat on a single plane that is parallel to the plane of the light receiving portion of the image sensor.

* * * * *